April 20, 1954     A. F. PESCE     2,675,580
HOT DOG KNIFE
Filed Nov. 9, 1950     2 Sheets-Sheet 1
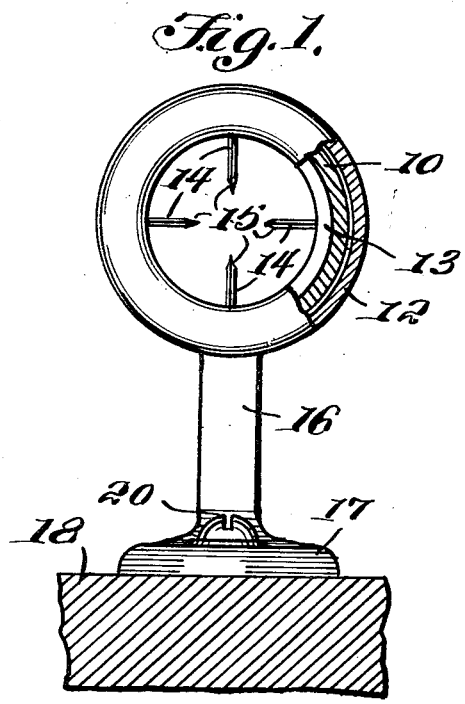
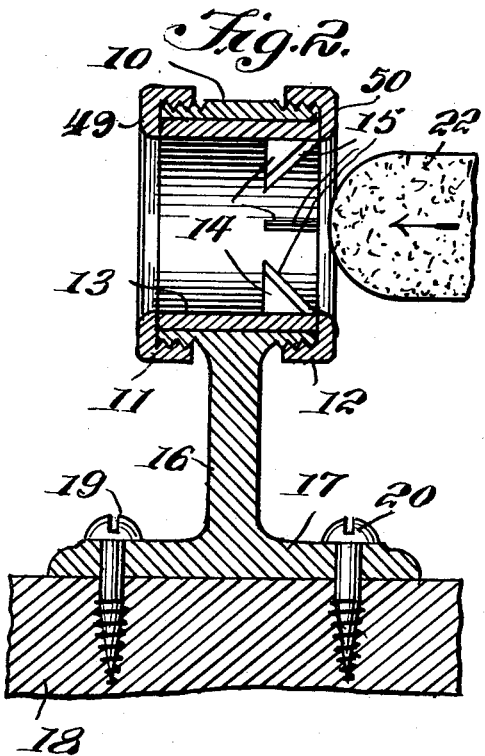
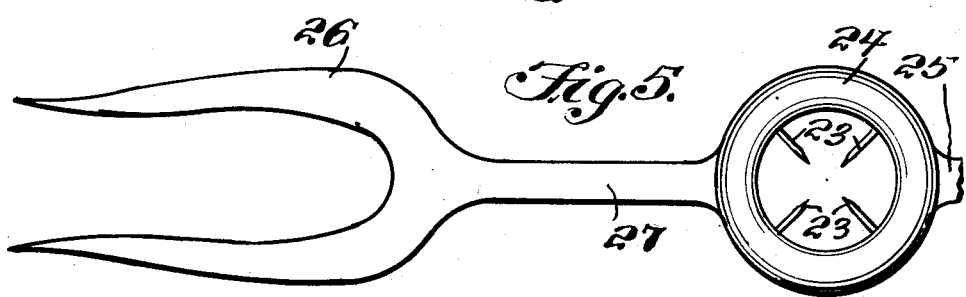
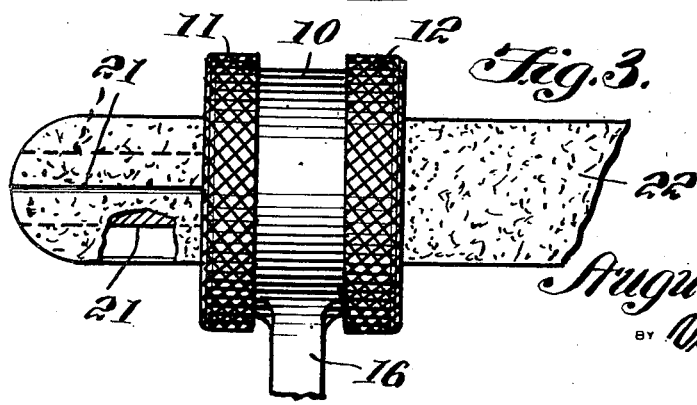
INVENTOR.
Augustine F. Pesce,
BY Victor J. Evans & Co.
ATTORNEYS

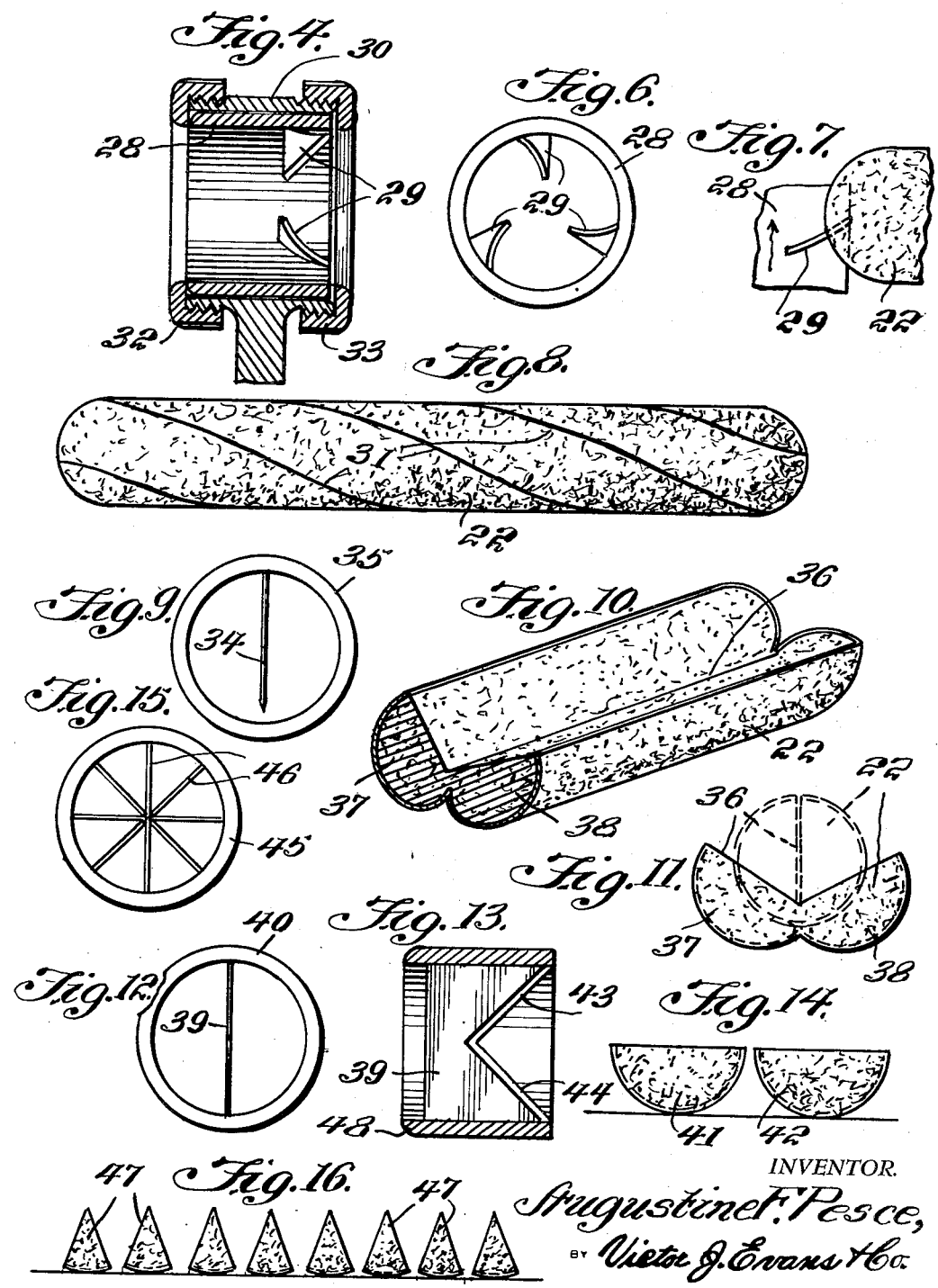

Patented Apr. 20, 1954

2,675,580

UNITED STATES PATENT OFFICE 2,675,580

HOT DOG KNIFE

Augustine Franklin Pesce, Philadelphia, Pa.

Application November 9, 1950, Serial No. 194,786

2 Claims. (Cl. 17—25)

This invention relates to cutters particularly as used in the culinary arts, and in particular a collar having a knife or plurality of knives extended inwardly from the inner surface and a holder in which the collar is removably mounted and in which the collar is free to rotate as a hot dog, frankfurter, sausage or the like is actuated, longitudinally therethrough.

The purpose of this invention is to provide a manually actuated device for slitting the skin of a sausage to facilitate tenderizing a sausage for grilling and wherein the slit or slits may form straight open cuts extended longitudinally through the sausage or may be spirally positioned.

Various attempts have been made to slit or cut the skin of hot dogs and sausage of this type to make the final product more appealing and also more appetizing but because of the shape it is difficult to hold a hot dog on a block while attempting to cut or slit the skin longitudinally. With this thought in mind this invention contemplates a knife or a plurality of knives extended inwardly from a rotating collar whereby as a sausage, hot dog, or the like is forced longitudinally through the collar longitudinally or spirally disposed slits are formed through the skin and extend into the meat thereof.

The object of this invention is, therefore, to provide means for holding a circular cutting element whereby flexible elements such as sausage and hot dogs may be forced therethrough to cut slits in the peripheral surface thereof.

Another object of the invention is to provide a manually actuated cutter for slitting and cutting hot dogs, sausage and the like which is adapted to cut sausage of the conventional type and as it is now supplied to the market.

A further object of the invention is to provide a cutter for hot dogs and the like which is of a simple and economical construction.

With these and other objects and advantages in view the invention embodies a handle having a hollow cylindrical casing thereon with threads on the ends of the casing, and a collar with cutting knives extended inwardly from the inner surface freely mounted and positioned to rotate in the said cylindrical casing whereby hot dogs, sausage and the like forced therethrough are provided with straight or spiral slits in the surfaces, or are cut into sections or segments to facilitate tenderizing for grilling.

Other features and advantages of the invention will appear from the following description taken in connection with the drawings wherein:

Figure 1 is an end elevational view of a typical form of knife showing the knife mounted in a cylindrical casing on a stand with part of the casing broken away and shown in section.

Figure 2 is a longitudinal section through the cutter as illustrated in Fig. 1, and illustrating an end of a sausage positioned to enter the cutting knives.

Figure 3 is a side elevational view showing the casing of the cutter with a hot dog passed part of the way through the cutter.

Figure 4 is a fragmentary longitudinal section similar to that shown in Fig. 2 illustrating cutters formed to travel in a spiral as a sausage is passed through the device.

Figure 5 is a detail illustrating a modification wherein the cutting elements are incorporated in a handle of a fork.

Figure 6 is an end elevational view of the collar used in the cutter and in which the collar is provided with spiral knives of the type illustrated in Fig. 4.

Figure 7 is a detail illustrating the end of a sausage being forced over one of the cutting elements.

Figure 8 is a side elevational view of a sausage in which a spiral cut has been made.

Figure 9 is a detail showing a further modification and illustrating the end of a collar with an elongated straight cutting knife therein.

Figure 10 is a view showing a length of sausage substantially cut in half by the type of knife illustrated in Fig. 9.

Figure 11 is a cross section through the sausage shown in Fig. 10.

Figure 12 is an end elevational view of the knife holding collar illustrating a still further modification wherein the knife extends continuously across the collar whereby a sausage forced therethrough is cut in half longitudinally.

Figure 13 is a longitudinal section through the collar illustrated in Fig. 12.

Figure 14 is a view showing the two halves of a sausage formed by the cutters shown in Figs. 12 and 13.

Figure 15 is also an end elevational view of the collar illustrating a still further modification wherein a plurality of spaced cutting knives extend across the inner surface of the collar so that a sausage forced therethrough is divided into a plurality of segments as shown in Fig. 16.

Figure 16 is a cross section through a sausage cut by the cutter illustrated in Fig. 15 and wherein the parts are opened out to illustrate a plurality of sections.

Referring now to the drawings wherein like reference characters denote corresponding parts the hot dog or sausage cutter of this invention includes a cylindrical casing 10, caps 11 and 12 threaded on the ends of the casing and a cylindrical collar 13 which is freely rotatable in the casing and which is provided with inwardly extended knives 14 which, as illustrated in Fig. 2 are triangular shaped and which are provided with sloping cutting edges 15.

In the design shown in Figs. 1 and 2 the casing 10 is positioned on a pedestal 16 having a base 17 and the base may be secured to a table, counter, or chopping block as indicated by the numeral 18 by screws 19 and 20.

In this design the caps 11 and 12 are threaded on the ends of the cylindrical casing 10 whereby a sausage passed therethrough is slit longitudinally forming straight lines 21 as illustrated in Fig. 3. The sausage, which is indicated by the numeral 22 is inserted in the end of the cutter in which the knives are positioned and by holding the sausage in one hand it may be forced through the cutter with the skin thereof being slit by the knives as shown and described.

In the modification illustrated in Fig. 5 the cutter is formed with a similar cylindrical casing similar to the casing 10 and knives 23 extend inwardly from the inner surface of the collar which is secured in the casing by caps 24. In this design the casing is formed in a handle 25 and a fork 26 is carried by the end of the handle through a shank 27. It will be understood that the cutter may be incorporated in the handle of an implement of any suitable type or design.

In the design illustrated in Figs. 4 and 6 the collar 28, similar to the collar 13 is provided with a plurality of cutting knives 29 which are shaped so that as a sausage or the like is forced through the knives the collar 28, which is freely rotatable in a casing 30, similar to the casing 10, rotates slowly as the sausage passes therethrough whereby the knives 29 form spiral slits or cuts, as indicated by the numeral 31, in Fig. 8.

In this design caps 32 and 33 are threaded on the ends of the casing and annular flanges 49 and 50 thereof retain the collar 28 in position and, as illustrated in Fig. 4 the length of the collar is less than that of the casing so that the collar is not clamped by the flanges of the caps.

In the illustration shown in Fig. 7 one of the spiral cutting knives 29 is shown in the position of entering an end of a sausage 22 and with the parts in this position a lateral thrust is imparted to the blade and freely rotatable collar so that the collar rotates with the movement of the sausage therethrough.

In the design illustrated in Fig. 9 a straight knife 34 extends from the inner surface of a collar 35 and with the collar 35 held in the casing 10 the sausage is forced through the cutter which is provided with a longitudinally disposed cut 36 whereby the sausage is substantially divided into sections 37 and 38.

In the design illustrated in Figs. 12 and 13 the blade 39, mounted in a collar 40 extends continuously across the collar and a sausage forced through the cutter having a collar with a blade of this type therein is cut into halves 41 and 42, as illustrated in Fig. 14. To facilitate cutting, the knife or blade 39 is formed with cutting edges 43 and 44 which provide a V-shaped cutting surface.

In the design illustrated in Fig. 15 a collar 45 is provided with a plurality of continuous blades 46 and a sausage cut through the center as it is passed through a cutter having blades of this type therein is cut into sections as indicated by the numeral 47 and as shown in Fig. 16.

It is understood, therefore, that the cutter may be provided with a single blade or a plurality of blades and the blades may extend partly into the collar or may extend straight across the collar.

It will also be understood that the blades may be straight or arcuate, or formed of any suitable shape or design.

A collar, in which the blades are rotated or held stationary in the outer casing may be provided, as illustrated in Fig. 13, with an arcuate inner edge 48 to facilitate rotation thereof in the casing.

It will be understood that other modifications may be made in the design and arrangement of the parts without departing from the spirit of the invention.

What is claimed is:

1. A sausage cutter comprising a supporting means having a hollow casing thereon, a rotatable hollow cylindrical open ended collar rotatably supported in said casing, a pair of spaced parallel caps arranged in threaded engagement with the ends of said casing, each of said caps being provided with an opening therein, the outer surface of said caps being knurled, and a plurality of blades extending inwardly from said collar and secured thereto, each of said blades being triangular in shape and provided with a sloping cutting edge, the inner ends of said blades being spaced from each other, and said cutting edges extending diagonally inwardly from an end of said collar.

2. A sausage cutter comprising a cylindrical casing having a mounting shank extended from the outer surface, a cylindrical collar having radially disposed cutting knives integral therewith and positioned therein freely mounted in said casing and adapted to rotate therein, and caps having inwardly extended annular flanges secured on the ends of the cylindrical casing with the flanges positioned to overlap the ends of the collar for retaining the collar in the casing.

References Cited in the file of this patent

UNITED STATES PATENTS

| Number | Name | Date |
| --- | --- | --- |
| 213,651 | Grimes | Mar. 25, 1879 |
| 1,176,360 | German | Mar. 21, 1916 |
| 2,552,046 | Justice | May 8, 1951 |